Figure 1:
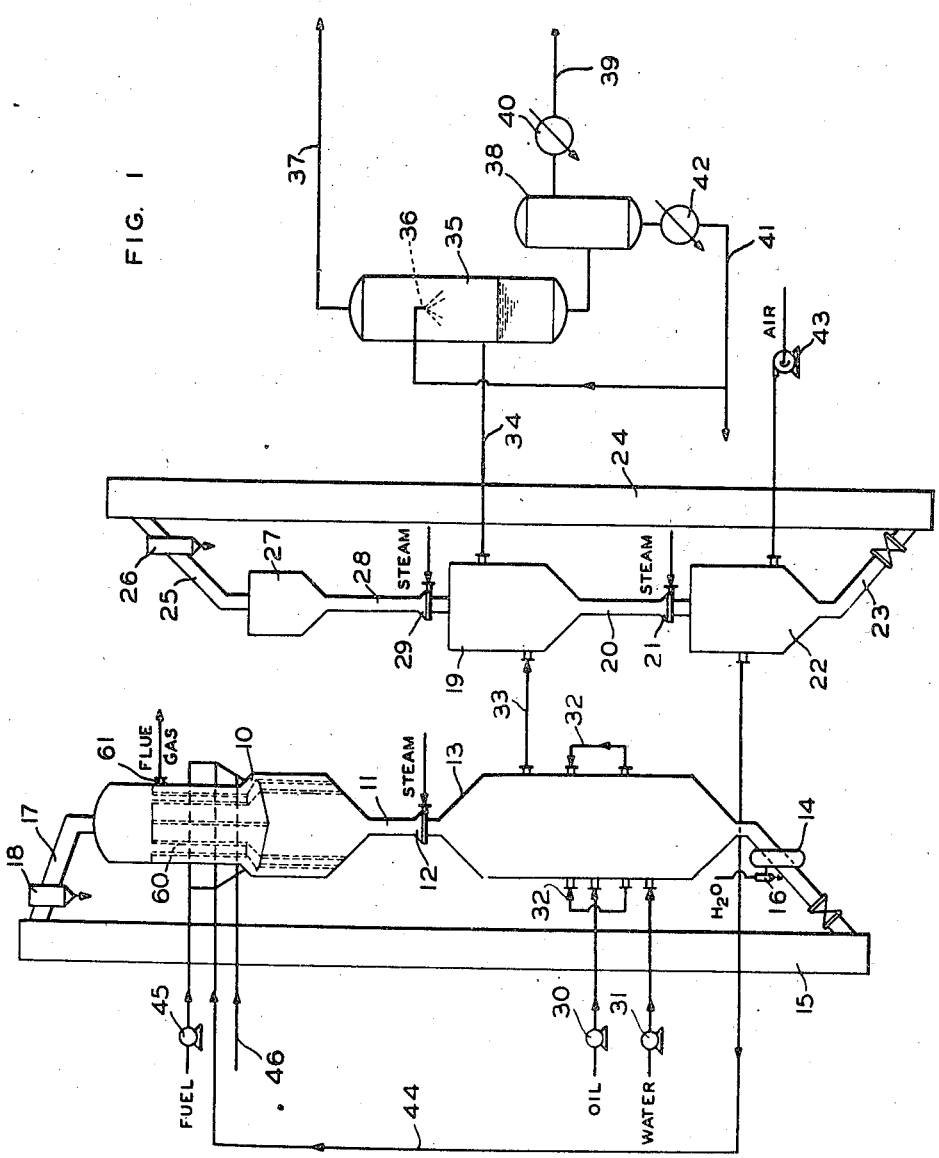

SYLVANDER C. EASTWOOD
ROBERT D. DREW
INVENTORS

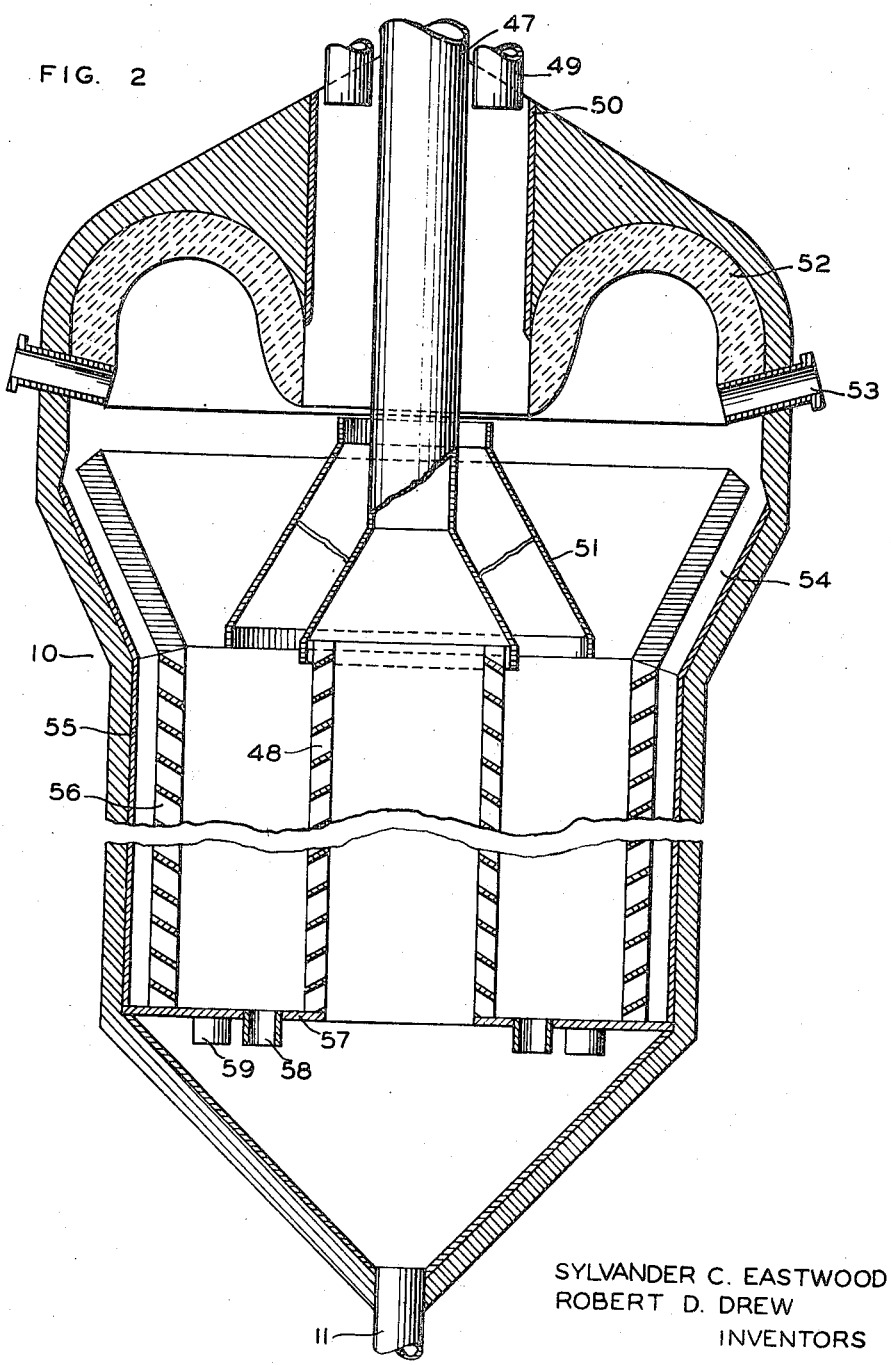

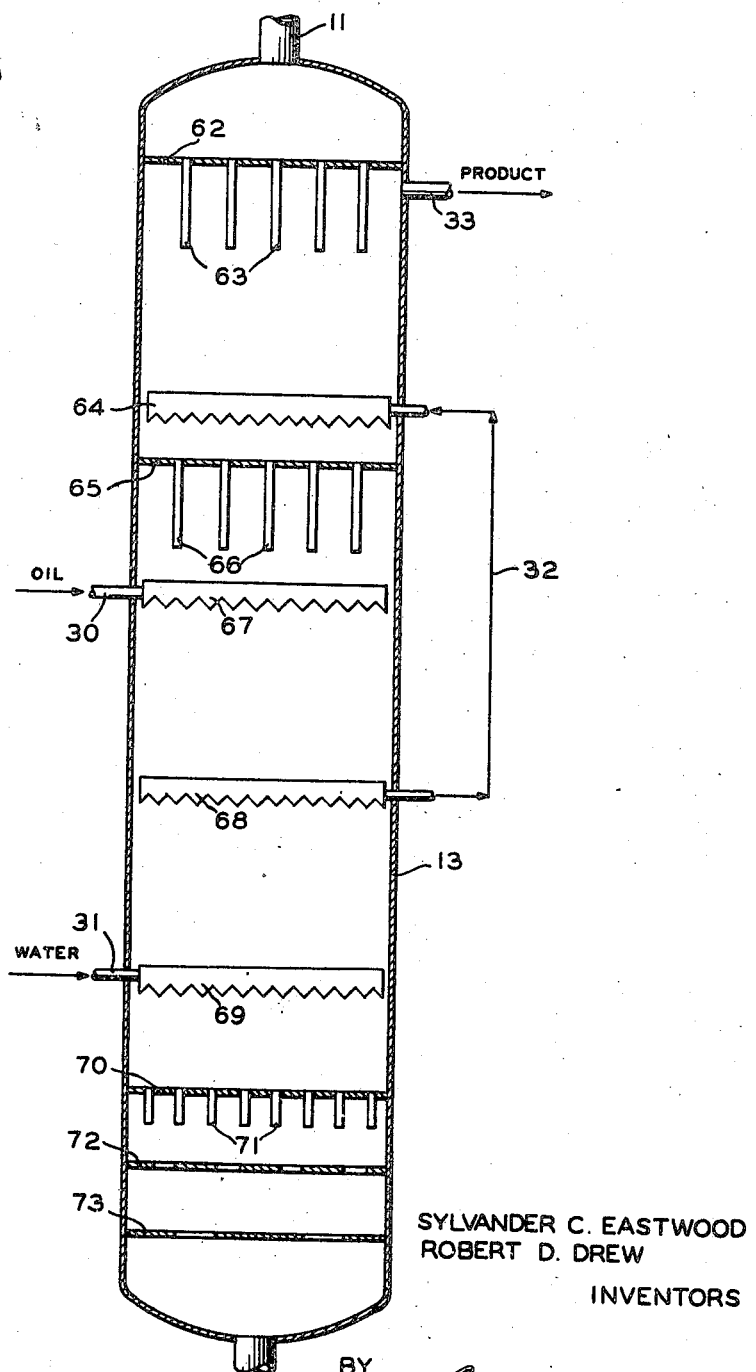

Patented Feb. 17, 1948

2,436,254

UNITED STATES PATENT OFFICE 2,436,254

PROCESS AND APPARATUS FOR THE THERMAL CRACKING OF HYDROCARBONS

Sylvander C. Eastwood, Woodbury, and Robert D. Drew, Wenonah, N. J., assignors to Socony-Vacuum Oil Company, Incorporated, a corporation of New York Application April 4, 1946, Serial No. 659,448

3 Claims. (Cl. 196—55)

This invention relates to apparatus for contact between a fluid and a solid and to a process of contacting a fluid and a solid. More particularly, the invention contemplates as a specific embodiment, apparatus and process for generating and preheating a reaction mixture and for elevating the reaction mixture to a desired reaction temperature.

The invention is particularly well suited to a process for manufacture of ethylene and the like by contacting a hydrocarbon fraction such as a gas oil or a topped crude in the presence of steam with a hot granular solid to thereby raise the temperature of the reaction mixture to the desired reaction temperature (say 1400° to 1600° F.) and thereafter rapidly quenching the reaction mixture to halt the reaction.

According to this invention, a compact bed of highly heated granular solid is passed downwardly through a reactor through zones of decreasing temperature. In the uppermost zone a reaction mixture of hydrocarbon vapor and water vapor is contacted with highly heated solids to thereby produce the desired reaction temperature whereupon the reaction mixture is promptly quenched and the desired products recovered therefrom. In a middle zone hydrocarbons are preheated, preferably vaporized from the liquid state and preheated, during concurrent flow with respect to the moving bed of solids. In a still lower zone, steam is superheated, preferably generated from liquid water and superheated. The hot oil vapors from the middle zone and the superheated steam from the lowest zone are collected together, mixed and transferred to the uppermost zone as the reaction mixture mentioned above.

The objects and advantages of the invention will be more clearly understood from consideration of a specific embodiment wherein the present invention is utilized as part of a complete system for the manufacture of ethylene from gas oil or the like. As an example, there will be considered a process wherein the hot products of combustion are quenched by contact with a relatively cold granular solid, which solid is thereafter cooled by contact with air thus generating preheated air for use in burners to heat a separate cycle of granular solids employed for producing the desired reaction temperature according to the invention. Such an exemplary embodiment is shown in the annexed drawings; wherein Figure 1 is a diagrammatic showing of a typical plant for practicing the invention;

Figure 2 is a vertical section through one type of heater for the reaction cycle; and Figure 3 is a vertical section through the contactor in the reaction cycle.

Referring specifically to Figure 1, the embodiment shown utilizes two separate circulating systems for granular solid. In the reaction cycle, the solid is heated in a heater 10 and passed downwardly at high temperature through a feed leg 11 having a steam sealing zone 12 to a reactor 13. In the reactor 13 hydrocarbon reactants are passed in direct contact with the hot solid in a manner to be described in detail hereinafter. Spent solids from the reactor 13 pass through a purging pot 14 to an elevator 15. The purging pot may advantageously be an enlarged zone held under slight vacuum by an injector 16. The granular solids from reactor 13 are transferred in elevator 15, for example at about 900° F., to a feed chute 17 having a classifier 18 for removal of small particles.

In the quenching cycle, reaction mixture from reactor 13 enters a quench chamber 19 wherein it is contacted with relatively cold granular solids to reduce the temperature to a level below that at which reaction occurs. This results in heating the granular solid and depositing thereon a combustible contaminant. The hot contaminated solid passes by a feed leg 20 having a steam sealing zone 21 to a cooler 22 wherein the granular solid is contacted with air or other suitable cooling medium; the cold solid passing by line 23 to elevator 24 from the top of which it enters chute 25 having a classifier 26 and passes to a feed hopper 27. The cold solids from feed hopper 27 pass downwardly by feed leg 28 equipped with a steam sealing zone 29 to enter the quencher 19.

In the reaction specifically discussed herein as exemplary, it is desirable to have a quantity of steam mixed with the hydrocarbons during reaction. According to one embodiment of the invention, oil vapors are generated by injecting liquid oil from pump 30 directly into the bed of hot solids in reactor 13 and injecting liquid water from pump 31 to a lower point in the reactor for generation of steam. The oil and water vapors are mixed within reactor 13 and transferred by lines 32 to a higher point in the reactor wherein the mixed vapors contact granular solid at its higher temperature and undergo reaction. The reaction products are promptly transferred by line 33 to quench chamber 19 wherein their temperature drops below that at which reaction will take place and the cooled vapors pass by line 34 to a spray condenser 35 wherein a spray of cold liquid from spray head 36 lowers the temperature to such an extent that light hydrocarbon gases are separated from heavier hydrocarbons and pass overhead by line 37 to suitable fractionation and purification equipment. The liquid mixture of oil and water in the bottom of spray condenser 35 is transferred to a settler 38 wherein water and oil are separated, the latter being transferred by line 39 through cooler 40 to storage or means for separation of valuable constituents thereof. The water layer from the bottom of settler 38 is removed by line 41 through cooler 42 and may be recycled in part to the spray head 36. A portion of the water from the bottom of settler 38 may be used for the generation of steam in reactor 13 since the system of steam generation used therein is fully capable of utilizing dirty water for generation of clean steam. Any contaminants in the water are deposited on the solid for later removal in the heater 10 by burning.

As noted above, air is passed through the cooling zone 22 wherein it is preheated and later used for generation of hot products of combustion for heating of the granular solid in heater 10. Air for this purpose is supplied by compressor 43 and is heated in cooler 22 from which it is passed by line 44 to burners in heater 10. As shown, fuel, for example hydrocarbon gases, may be supplied to the heater 10 by compressor 45. When utilizing a liquid fuel such as a heavy petroleum fraction, atomizing steam for the burners can be supplied to the heater 10 by line 46.

A typical structure for the heater 10 is shown in Figure 2 wherein the burners and gas-solid contact means are arranged around a central flue including the chimney 47 and a louvered wall 48, the purpose of which will be brought out below. Granular solids are admitted to the heater by a feed pipe 49 from which they pass downward through an annular space between the chimney 47 and a side wall 50. In this annular space indirect heat exchange between hot gases and the incoming solid takes place to aid in heating the granular solid. The preheated solid then meets a dividing cone 51 which splits the solid stream to an inner portion lying against the diverging bottom of chimney 47 and an outer portion which is exposed at its surface to a combustion chamber enclosed by a refractory arch 52.

Disposed below the arch 52 are a plurality of ports 53 to receive burners for generation of a flame impinging directly upon the granular solids lying against the conical divider 51. The hot products of combustion are transferred by a passage indicated generally at 54 to an annular space between the outer wall 55 of the heater and a second louvered wall 56 which defines a passage for the granular solids between the walls 48 and 56. The hot products of combustion pass transversely through the downwardly moving solids to enter the central flue below chimney 47 from which they are removed by the said chimney 47 to economizers or the like. To insure even flow of the granular solids between walls 48 and 56, there is provided a plate 57 across the bottom of the granular solid passage pierced by two rings of tubes 58 and 59. The tubes 59 in the outer ring are staggered with respect to the tubes 58 in the inner ring thus providing a plurality of withdrawal points spaced a short distance apart to minimize the small heap of nonflowing or slowly moving solids therebetween. Hot solids pass from pipes 58 and 59 downward to the feed leg 11 from which they are transferred to the reactor 13 as previously noted.

A slightly different modification of the heater 10 is indicated in Figure 1 wherein the central flue is defined by louvered walls below the burner as in Figure 2 and is also defined by similar louvered walls above the burner as indicated at 60. In this case the hot products of combustion from the lower heat transfer region pass to an upper heat transfer region above the burners, flow outwardly through solids between louvered walls and are removed by a port 61.

The reactor is of relatively simple structure but accomplishes the several functions of vaporizing oil and water, mixing the vapors and contacting the vapor mixture with highly heated solids. Solids admitted from feed leg 11 fall onto a tube sheet 62 from which a number of feed pipes 63 depend. The solids move downwardly as a compact bed below the feed pipes 63 past a plurality of vapor distributors 64 to a second tube sheet 65 which again has feed pipes 66 depending therefrom. The granular solids again move down as a compact bed past distributors 67, vapor collectors 68 and distributors 69 to a plate 70 having a plurality of withdrawal tubes 71 similar in function to tubes 58 and 59 shown in Figure 2. Plate 72 has a lesser number of openings than does plate 70 to equalize withdrawal from the several pipes 71 and plate 73 has a still lesser number of openings for the same reason.

As the hot solids move downward through the reactor 13 they are gradually cooled but sufficient heat is retained to adequately vaporize the oil charge and the water admitted for generation of steam. The single vessel thus generates oil vapors from liquid admitted by line 30 and distributors 67 and generates steam from liquid water admitted by line 31 and distributor 69. The oil vapors move downwardly, since the pipes 66 constitute a seal of reasonable efficiency, and mingle with steam at collector 68 to form a mixture of hydrocarbon vapors and water vapor which is transferred by line 32 and distributors 64 to the upper part of the chamber. This reaction mixture passes upwardly countercurrent to the very hot solids in the top of the reactor and is thus rapidly heated to the desired reaction temperature and passes into the space among tubes 63 which is free of solids, from which it is withdrawn by pipe 33 and transferred as described to quenching chamber 19 to be rapidly cooled to a temperature below that at which reaction occurs.

A high yield of ethylene is produced at a mean effective temperature of 1454° F. and 0.40 second reaction time using 51.3% of steam by weight based on total charge. The granular solid used was particles of fused alumina at a maximum temperature during contact of about 1560° F. A granular solid to oil ratio of 11.9 (based on weight) was employed at a space velocity of 2.03 liquid volumes of gas oil at 60° F. per volume of reaction space per hour, calculating reaction space as that portion of the reactor wherein the charge is finally heated to reaction temperature and excluding vaporizing and preheating zones. This operation produces 27.7% by weight of ethylene together with substantial amounts of other olefins including butadiene, butene, propylenes, etc. The process also yields 7.5% of highly aromatic gasoline.

We claim:

1. A process for the thermal cracking of hydrocarbons which comprises passing a hot granular solid downwardly through a contacting zone including a charge preparation section and a high temperature cracking section thereabove, introducing liquid hydrocarbons to the upper part of said charge preparation section to be vaporized and preheated by contact with hot solids from said cracking section, introducing liquid water to the lower part of said charge preparation section to be vaporized and preheated by contact with said hot solids, flowing vapors from the upper and lower parts of said charge preparation section to an intermediate part thereof and combining vapors to form a vaporous mixture of hydrocarbon vapor and water vapor, withdrawing said mixture from said charge preparation section and passing said mixture in direct contact with and countercurrent to the downwardly moving hot granular solid in said high temperature cracking section.

2. Apparatus for the thermal conversion of hydrocarbons comprising a vertical contacting chamber, means to admit granular solids to the top of said chamber, means to withdraw granular solids from the bottom of said chamber, vertical pipes of restricted cross-section intermediate the ends of said chamber, a horizontal partition extending across said chamber at the level of the upper ends of said vertical pipes and pierced by said pipes to divert granular solids moving downward through said chamber to said vertical pipes to provide a sealing zone extending from said horizontal partition to the bottom of said vertical pipes, fluid collecting means intermediate said sealing zone and the bottom of said chamber, a first fluid charge distributor intermediate said fluid collector and said sealing zone, a second fluid charge distributor intermediate said fluid collector and the bottom of said chamber, a third fluid charge distributor within said chamber above said sealing zone, means to withdraw fluid product from a point in the upper part of said chamber spaced above said third fluid charge distributor and means to transfer fluid from said fluid collecting means to said third fluid charge distributor.

3. A process for the thermal cracking of hydrocarbons which comprises passing a hot granular solid through a high temperature cracking zone, contacting a charge mixture of hydrocarbon vapors and steam with said solid in said cracking zone to thereby crack said vapors, thus lowering the temperature of said solid, passing granular solid so cooled from said cracking zone to a charge preparation zone, introducing hydrocarbons to said charge preparation zone and contacting said hydrocarbons with said solid in said charge preparation zone to heat the hydrocarbons by heat retained in the solid at the time of leaving said cracking zone, introducing water to said charge preparation zone and contacting said water therein with said solid to thereby vaporize and heat said water by means of heat retained in said solid, combining the heated vapors of water and hydrocarbons to form a vaporous charge mixture and passing said mixture to said cracking zone as aforesaid.

SYLVANDER C. EASTWOOD.
ROBERT D. DREW.

REFERENCES CITED

The following references are of record in the file of this patent:

UNITED STATES PATENTS

| Number | Name | Date |
|---|---|---|
| 2,331,343 | Phillips | Oct. 12, 1943 |
| 2,393,636 | Johnson | Jan. 29, 1946 |